Aug. 22, 1939.  E. A. REID  2,170,463
TOOL FOR SHARPENING LAWN MOWERS
Filed July 11, 1938
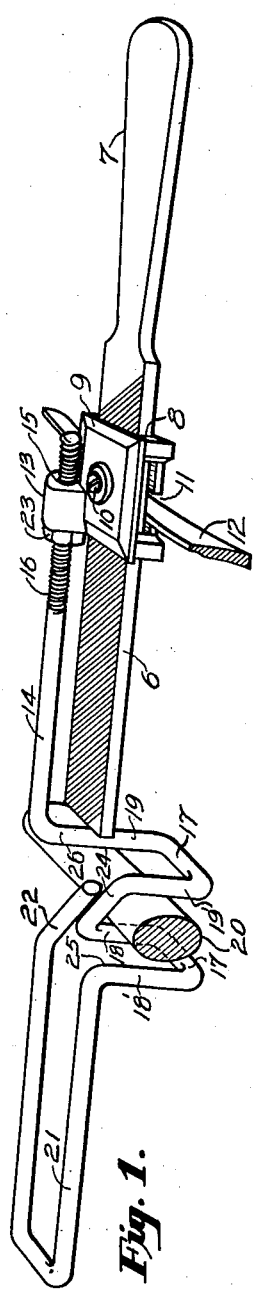
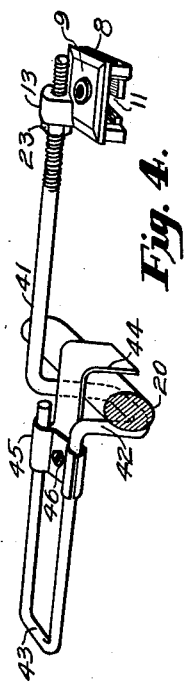
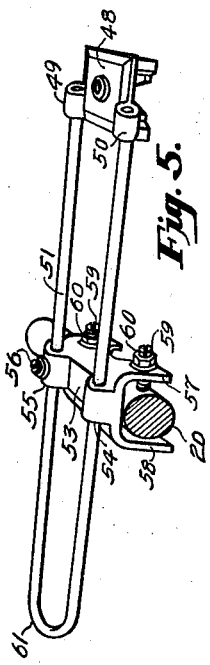
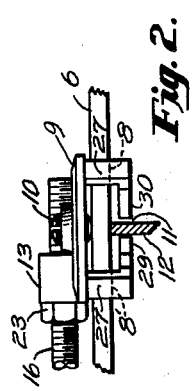
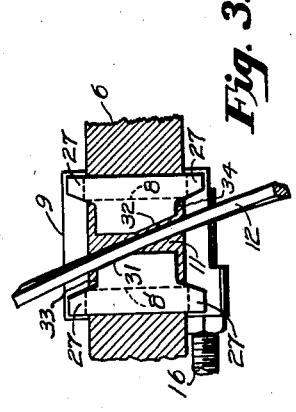
Inventor
Elmer A. Reid.

Patented Aug. 22, 1939

2,170,463

UNITED STATES PATENT OFFICE 2,170,463

TOOL FOR SHARPENING LAWN MOWERS

Elmer A. Reid, Morrisville, Pa.

Application July 11, 1938, Serial No. 218,526

5 Claims. (Cl. 76—82.1)

This invention relates to lawn mower sharpeners, and more particularly to a type of sharpener which is adapted to move manually along the tie rod and the rotary blade of a mower. This invention is concerned with certain improvements therein.

An object of the invention is to provide a tool for sharpening lawn mowers which is simple yet durable in construction and convenient for use.

Another object is to provide, in a sharpening tool for lawn mowers, an improved means for permanently locking the adusted spacing of the means engaging a mower's tie rod and the means engaging a mower's rotary blade.

Another object is to provide, in a sharpening tool for lawn mowers, novel and improved means for resetting lengthwise, over its full length, a sharpening element without affecting the permanently adusted spacing of the means engaging a mower's tie rod and the means engaging a mower's rotary blade.

A further object is to provide, in a tool for sharpening lawn mowers, a holder having file holding means and a separately arranged guide frame support, and a pair of jaws adapted to guide the curved rotary blades of a mower.

A further object is to provide, in a tool for sharpening lawn mowers, an open-type frame with a handle on one end and with guide means intermediate the ends for spanning the tie rod of a mower.

A still further object is to provide a tool for sharpening lawn mowers wherein the tool's guide means, engaging the tie rod of a mower, is adjustable.

A still further object is to provide a lawn mower sharpening tool with one handle solidly formed on the end of a file and with the opposite handle, adapted to receive the free end of a file, formed on the end of an open-type frame.

The forgoing and other objects will become apparent from the detailed description of a specific embodiment of my invention for which reference is made to the accompanying drawing wherein like reference characters refer to like elements and in which:

Fig. 1 is a perspective view of the invention engaging a fragmentary section of the tie rod and of a rotary blade of a mower.

Fig. 2 is a side view of the holder showing a fragmentary section of a blade and a section of a file.

Fig. 3 is a view of the underside of the holder, of a longitudinal fragmentary section of the curved blade of a lawn mower, and of a file.

Fig. 4 is a perspective view of a modification of the guide element of the frame, shown in Fig. 1, engaging a fragmentary section of a tie rod.

Fig. 5 is a perspective view of a further modification of the guide element of the frame, shown in Fig. 1, engaging a fragmentary section of a tie rod.

Referring particularly to Fig. 1, Fig. 2, and Fig. 3 the reference character 6 designates a sharpening element, preferably a file, formed with a solid handle 7 on one end thereof. The file is disposed lengthwise through slots 8 and 8' of the holder 9. The set screw 10 extending downwardly through the top of the holder 9, secures the file in position. The holder 9, which is made of brass or other suitable material, is further provided with a gap 11 through the bottom section for engaging the curved rotary blade 12 of a lawn mower and for exposing a transverse section of the under face of the file to the rotary blade. The holder is also provided with a lug 13 for supporting the open-type frame element 14.

The lug 13, in this instance, has a threaded hole 15 which provides a threaded engagement for the threaded end 16 of the frame element. This open-type frame element 14, which is preferably made of stiff rod or wire, has intermediate its ends a pair of U-shaped bends 17 joined together to form opposing vertically disposed guide members 18 and 18', and 19 and 19'. These guide members are adapted to slidably engage the tie rod 20 of a mower. One end of the frame is further formed to provide a handle 21 which terminates with the diagonally bent portion 22.

The threaded end 16 of the frame 14 provides an adustable connection with the holder 9 through lug 13. The nut 23, carried by the threaded portion 16, locks the frame in any adjusted position.

When the set screw 10 is loosened the file 6, disposed longitudinally in slots 8 and 8', can be shifted inwardly or outwardly to allow the use of approximately the full length of the file for sharpening.

The open construction of the handle 21 further provides for the convenient use of a file of ordinary length by sliding the free end of the file between the horizontal portions 22 and 24 and the inside faces of the upper portions 25 and 26 of the vertically disposed guide members 18' and 19.

The holder 9, which may be made by the process of moulding or die casting, has intermediate portions 27. These intermediate portions 27, which provide the end closures of slots 8 and 8', are joined by the top and bottom sections of the holder to form an integral unit.

The bottom section embodies a pair of inwardly directed opposing jaws 29 and 30 to engage the curved rotary blade 12 of a mower, through gap 11. The angular face 31 of the jaw 29 slidably contacts the side of the blade 12 as the sharpener moves in one direction along the rotatable blade, and the angular face 32 of the opposing jaw 30 slidably contacts the opposite side of blade 12 as the sharpener moves in the opposite direction along the rotatable blade.

It should be observed that the contacting faces 31 and 32 extend angularly from the approximate center of the holder 9 in opposite directions to the off-sets formed by shoulders 33 and 34. These off-sets prevent the sharpened edge of the blade 12 from rubbing against the metal edges of the holder. The sharpened edge of the blade is further freed from possible contact with the metal holder by limiting the uppermost side of the jaws 29 and 30 to a plane which is substantially below the lower edge of the slots 8 and 8' upon which the file rests. Thus the sharpening edge of the blade contacts solely with the file.

Fig. 4, in modified form, illustrates a guide which is adapted to engage the tie rod of a mower and which may be adjusted to fit tie rods of various diameters. The open-type frame 41, which is adjustably supported by the file holder 9, previously described, is formed with an inverted U-shaped bend 42 and with a handle 43. 44, the opposite side of the guide, is made preferably of sheet metal and is shaped to extend over the tie rod of the mower and clamp to the handle 43. The clamp 45, which is adjustably mounted on handle 43 of the frame, provides adjusting means for varying the distance between the inverted U-bend 42 and the opposite movable side 44 of the guide. The screw 46 locks the clamp and the movable side 44 in any adjusted position.

Fig. 5, in modified form, illustrates a file holder 48 which is similar to holder 9, previously described. The holder 48 is adapted to engage the rotary blades of a lawn mower and to support longitudinally the U-bend frame from lugs 49 and 50.

A guide 53, which is adapted to span the tie rod of a mower and which may be adjusted to fit tie rods of various diameters, is adjustably mounted on frame 51 by lugs 54 and 55. Adjusting the guide 53 on frame 51 lengthens or shortens the distance between the file holder 48 and the guide 53 for adjusting the sharpener to a particular mower.

The set screw 56 locks the guide 53 in any adjusted position on the frame 51. The extended U-bent end portion 61 of the open-type frame 51 serves as one of the handles of the sharpener.

Guide 53 has spaced downwardly extending flanges 57 and 58 substantially forming an inverted channel. The flange 57, in this instance, is provided with spaced bosses and with a pair of horizontally disposed screws 59 therein. The screws 59 may readily be adjusted to engage mower tie rods of various diameters, thus allowing the guide 53 to slide freely along the tie rod. The nuts 60 lock the screws in any adjusted position.

In operation, the U-bend guide of the sharpener is placed over the tie rod of a lawn mower and the mower's curved rotary blade is engaged by the laws of the file holder 9. With a hand gripping each handle of the sharpener, the operator bears down lightly and moves both hands parallelly back and forth, thus sliding the sharpener firmly and evenly over the full length of the mower's tie rod and rotary blade. These back and forth movements cause a rotational movement of the blade.

The correct adjustment for a particular size and make of mower may be effected in the sharpener by lengthening or shortening the distance between the U-bend guide 17 and the holder 9. Loosening the lock nut 23, allowing the frame to be screwed inwardly or outwardly in the threaded lug 13 of the file holder 9, will permit these adjustments to be made.

Adjustments should be made which will show the file sharpening the back edge of the blade on the first strokings, and the full width of the blade on the final strokings, thus sharpening the blade's edge from back to front and providing a properly bevelled cutting edge.

Obviously the transverse section of the file, exposed by the gap 11 of the holder 9, will become dull from use. By loosening the set screw 10 the file may be shifted to an unused section and the set screw then retightened. Thus approximately the full length of both sides of the file may be utilized for long service without affecting the permanent adjustment of the sharpener.

The foregoing description and accompanying drawing disclose the preferred embodiment of my invention but the invention may be embodied in other specific forms without departing from the essential characteristics thereof.

What is claimed and desired to be secured by Letters Patent is:

1. A tool for sharpening a lawn mower comprising a holder having a lug extending from the upper portion thereof, said holder having a slot therethrough adapted to receive a file, and a transverse opening through the bottom portion thereof; a wire handle mounted adjustably in said lug and extending horizontally therefrom, said handle being bent intermediate the ends thereof to provide downwardly extending connected U shaped portions forming therebetween a guide channel; a file in said slot; and means for securing said file to said holder.

2. In a tool for sharpening a lawn mower, a holder providing means for supporting a wire handle comprising a threaded longitudinal opening, said holder having a slot therethrough adapted to receive a sharpening element; a wire handle having a threaded portion at one end thereof adapted to engage said threaded opening for longitudinal adjustment therein, said handle being bent intermediate the ends thereof forming a guide consisting of a downwardly extending connected U shaped portion for contacting the tie rod of a mower; and means for locking said handle in said threaded opening.

3. In a tool for sharpening a lawn mower, a holder providing means for supporting a wire handle comprising a threaded longitudinal opening, said holder having a slot therethrough adapted to receive a sharpening element, and an opening through the bottom portion thereof communicating with said slot; a wire handle mounted adjustably in said threaded opening and extending horizontally therefrom; means intermediate the ends of said handle providing a guideway adapted to slidably engage the tie rod of a mower, said means comprising opposing downwardly-extending portions, one of said opposing portions being U shaped forming an integral part of said handle, the other said opposing portion in L shape formation being adjustably mounted on said handle for varying the space between said opposing portions; and locking means for securing said adjustably mounted portion to said handle.

4. In a tool for sharpening a lawn mower, a holder having lug means extending from the upper portion thereof, said holder having a slot therethrough adapted to receive a sharpening element, and an opening through the bottom portion thereof communicating with said slot; a wire handle bent in U formation, the open end portion thereof being secured in said lug means with said handle extending horizontally from said holder; a guide mounted slidably on said handle, said guide being provided with lug means engaging said handle and with opposing downwardly-extending connected portions in channel formation, one of said opposing portions having a threaded opening; a screw adjustable in said threaded opening and extending therethrough to be in slidable contact with the tie rod of a mower; and means for locking said guide on said handle.

5. A tool for sharpening a lawn mower comprising a holder providing supporting means for a wire handle, said holder having a slot therethrough for receiving a file and having at the bottom portion thereof, disposed on a plane below said slot, opposing inwardly-directed jaws with angular faces adapted to slidably contact the sides of a curved blade of a mower below the cutting edge of said blade; a solid-handled file secured in said slot; a wire handle mounted adjustably in said supporting means and extending horizontally therefrom, said wire handle having the outer end thereof bent to surround the end of a file, and having a portion intermediate the ends thereof bent to form a guide consisting of downwardly extending connected U shaped portions for contacting the tie rod of a mower; and means for securing said wire handle to said holder.

ELMER A. REID.